Dec. 9, 1952 G. CARREAU 2,621,047

PHONOGRAPH

Filed April 9, 1948

INVENTOR
GERALD CARREAU
BY
Pennie, Edmonds, Morton & Barrows
ATTORNEYS

Patented Dec. 9, 1952

2,621,047

UNITED STATES PATENT OFFICE 2,621,047

PHONOGRAPH

Gerald Carreau, New York, N. Y., assignor to Columbia Broadcasting System, Inc., New York, N. Y., a corporation of New York Application April 9, 1948, Serial No. 19,919

2 Claims. (Cl. 274—1)

This invention relates to phonographs and particularly to controlling rotation of the turntable in accordance with the presence or absence of a record thereon.

Phonographs at the present time may be broadly classified into two categories, one consisting of automatic record players designed to play a number of records automatically in sequence, and the other consisting of single record players wherein individual records are placed on the turntable by hand. It is often desirable to control the energization of the turntable so that it will not rotate when there is no record thereon, but will have an energizing circuit established when a record is placed in playing position.

The present invention provides means for stopping the turntable when a record is removed, and for establishing an energizing circuit when a record is placed in playing position. In particular, the invention makes use of the weight of a record to control the operation of a switch in the energizing circuit of the turntable driving motor. When there is no record on the turntable, the switch is biased to its "off" position so as to deenergize the motor. When a record is placed on the turntable, it automatically moves the switch to its "on" position and establishes an energizing circuit for the motor. Additional switches may, of course, be used in conjunction with the record-actuated switch so as to jointly control the energization of the motor.

In accordance with the invention, a plunger is mounted in the turntable spindle for vertical movement therein. At the top of the plunger an element is provided which is engaged by a record when it is placed over the spindle. Normally, in the absence of a record, the plunger is in its upward position, but when a record is placed on the turntable it engages the plunger and depresses it. A switch controlled by the movement of the plunger is inserted in the motor-control circuit to control the energization of the motor.

While not limited thereto, the invention is particularly useful in connection with record players of the type described in application Serial No. 19,923, filed April 9, 1948 by P. C. Goldmark and D. P. Doncaster for "Record Player."

The invention will be more fully understood from the following description of a specific embodiment thereof, taken in conjunction with the drawings in which.

Figures 1, 2, 3, 4:
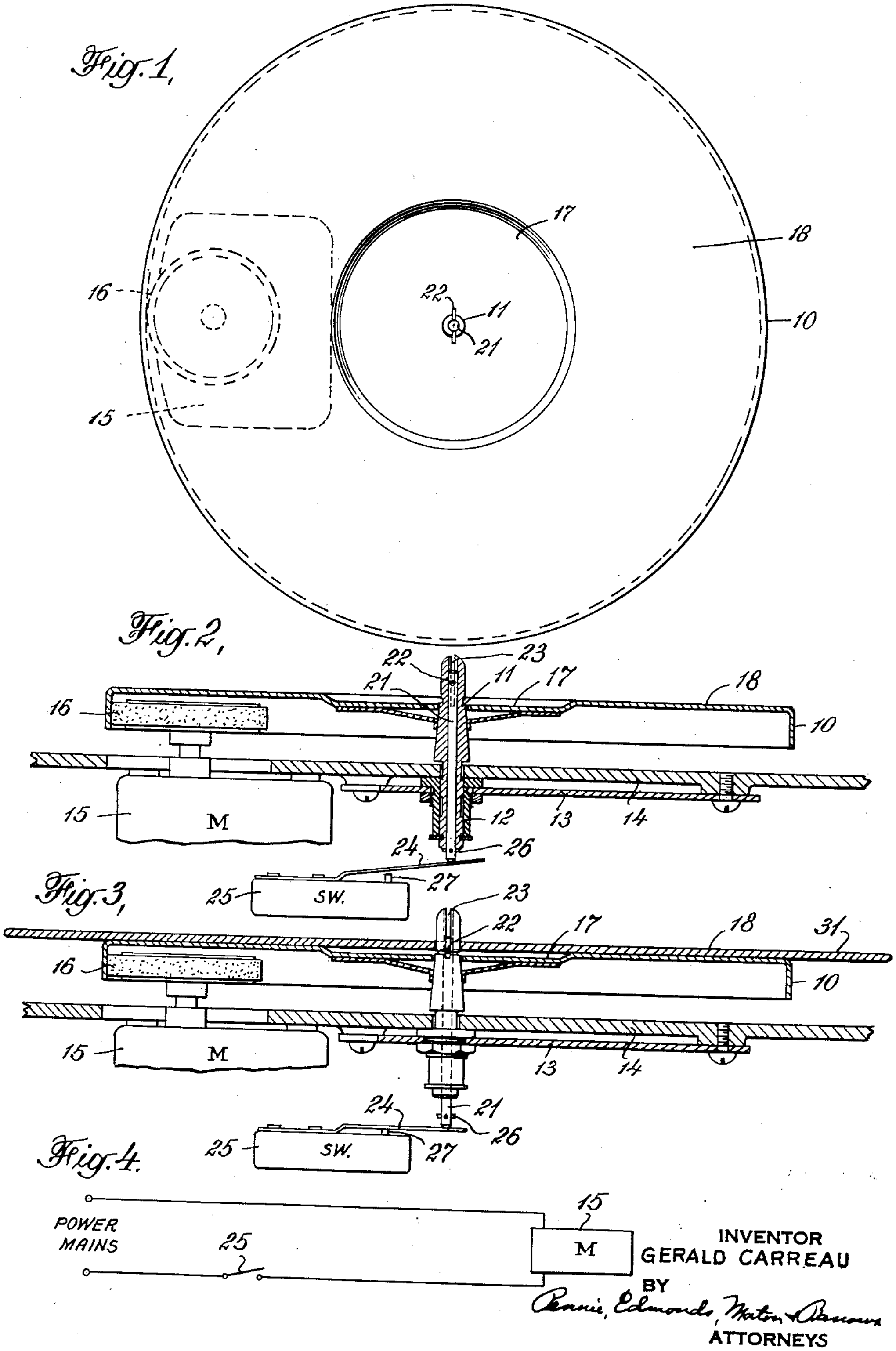
Fig. 1 is a top view of a record player turntable in accordance with the invention.
Fig. 2 is a section through the turntable spindle.
Fig. 3 is a view similar to Fig. 2 with a record on the turntable.
Fig. 4 is a circuit diagram showing the record-actuated switch in circuit with the turntable motor.

Referring to Fig. 1, a turntable 10 is mounted on a centrally-located vertical spindle 11 which is rotatably mounted in bearing 12 attached to the sub-assembly plate 13. Plate 13 in turn is mounted on base plate 14. The turntable is driven by motor 15 through a rim-drive wheel 16. Such a drive mechanism is well known in the art and need not be described further. Alternatively, a spindle drive mechanism could be employed if desired.

The diameter of the upper portion of spindle 11 is selected to fit the central hole of a disk record placed thereon, so that the record will be correctly positioned on the turntable. The central portion 17 of the turntable may be somewhat depressed below the level of the outer area 18 on which the record rests.

The spindle 11 is hollow, and plunger 21, in the form of a rod, is mounted therein for vertical movement. A cross pin 22 is affixed in the upper end of plunger 21 and extends laterally beyond the spindle so as to be engaged by a record placed thereon. The upper portion of spindle 11 is provided with vertical slots 23 in which pin 22 is guided.

The lower end of plunger rod 21 engages lever arm 24 of switch 25 which may be of the micro-switch type. Lever arm 24 is here shown as a spring which normally tends to force rod 21 upwards. A retaining pin 26 is provided to limit the upward movement of the rod. When lever arm 24 is depressed, it engages plunger 27 to actuate switch 25. Plunger 27 is biased toward its upper position by internal means.

Fig. 2 shows plunger rod 21 in its upward position, which is its normal position in the absence of a record. In this position, switch 25 is open and, as shown in Fig. 4, opens the energizing circuit to motor 15. When a record 31 is placed on the turntable, as shown in Fig. 3, the portion thereof surrounding the central hole engages pin 22 and the weight of the record depresses plunger rod 21. This closes switch 25 and establishes an energizing circuit for motor 15. The turntable will then start to rotate. When the record is removed, plunger rod 21 is forced upwards by the spring bias provided by lever arm 24 and resumes its normal position as shown in Fig. 2.

It should be understood that additional switches may be inserted in the control circuit of the motor, and operated by other instrumentalities so that the closing of switch 25 need not in itself fully complete the energizing circuit between the power mains and motor 15. However, the opening of switch 25 will break the circuit to the motor so that the turntable will not rotate when there is no record thereon.

The invention has been described in connection with a specific embodiment thereof and it will be understood that modifications may be made by those skilled in the art within the scope of the invention as defined in the following claims.

I claim:

1. In a phonograph, the combination which comprises a turntable and a central spindle associated therewith, said spindle being adapted to fit the central hole of a record to be reproduced to position the record on the turntable, an electric motor coupled to drive the turntable, a rod mounted in said spindle and adapted to move vertically therein, a slot in the portion of said spindle above the turntable surface, a pin movable in said slot and fixed with said rod, said pin projecting laterally from said spindle to be engaged by a record on said turntable and thereby depress said rod, a control switch positioned below said turntable and having an actuating member engaged by said rod to actuate the switch to one position when the rod is depressed, and bias means for raising said rod when no record is on the turntable and actuating said switch to another position, said control switch being in circuit to control the energization of said motor, whereby rotation of said turntable may be controlled by the weight of a record thereon.

2. In a phonograph, the combination which comprises a flat circular turntable and a concentric vertical hollow spindle associated therewith, said spindle being rotatably mounted in a fixed support, the upper portion of said spindle being adapted to fit the central hole of a disk sound record to be reproduced to position the record on the turntable, an electric motor coupled to drive the turntable, a rod mounted in said hollow spindle for vertical movement therein, a vertical slot in the upper portion of said spindle extending below the record-engaging portion of the turntable surface, a pin vertically movable in said slot and fixed with the upper portion of said rod, said pin projecting laterally from said spindle to be engaged by a record on the turntable and thereby depress said rod, a control switch mounted on said fixed support below said turntable and having an actuating arm engaged by the lower end of said rod to close the switch when the rod is depressed, and spring biassing means normally biassing the rod toward its raised position and the switch toward its open position to thereby open the switch when no record is on the turntable, said control switch being in series with said motor, whereby rotation of said turntable may be controlled by the weight of a record thereon.

GERALD CARREAU.

REFERENCES CITED

The following references are of record in the file of this patent:

UNITED STATES PATENTS

| Number | Name | Date |
|---|---|---|
| 1,436,129 | Watson | Nov. 21, 1922 |
| 1,954,247 | Jones | Apr. 10, 1934 |
| 2,092,668 | Goldsmith | Sept. 7, 1937 |
| 2,113,401 | Goldsmith | Apr. 5, 1938 |
| 2,482,659 | Davis | Sept. 20, 1949 |